US009319667B2

(12) United States Patent
Lin et al.

(10) Patent No.: US 9,319,667 B2
(45) Date of Patent: Apr. 19, 2016

(54) IMAGE CONVERSION METHOD AND DEVICE USING CALIBRATION REFERENCE PATTERN

(71) Applicant: INDUSTRIAL TECHNOLOGY RESEARCH INSTITUTE, Chutung, Hsinchu (TW)

(72) Inventors: Yu-Chen Lin, Taipei (TW); Wei-Cheng Liu, Miaoli (TW); Shao-Yuan Lee, Jinsha Township, Kinmen County (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 270 days.

(21) Appl. No.: 14/065,852

(22) Filed: Oct. 29, 2013

(65) Prior Publication Data

US 2014/0184814 A1 Jul. 3, 2014

(30) Foreign Application Priority Data

Dec. 28, 2012 (TW) .............................. 101151114 A

(51) Int. Cl.
*H04N 17/00* (2006.01)
*B60R 1/00* (2006.01)
*G06T 7/00* (2006.01)
(52) U.S. Cl.
CPC ............... *H04N 17/002* (2013.01); *B60R 1/00* (2013.01); *G06T 7/0018* (2013.01); *B60R 2300/402* (2013.01)
(58) Field of Classification Search
CPC . H04N 7/002; G06T 7/0018; B60R 2300/402
USPC ....................................................... 348/148
See application file for complete search history.

(56) References Cited

U.S. PATENT DOCUMENTS 8,212,878 B2 7/2012 Shima et al.
2008/0031514 A1 2/2008 Kakinami
(Continued)

FOREIGN PATENT DOCUMENTS

CN 102542245 7/2012
JP 2004200819 7/2004
(Continued)

OTHER PUBLICATIONS

Zhang, "Flexible Camera Calibration by Viewing a Plane From Unknown Orientations", The Proceedings of the Seventh IEEE International Conference on Computer Vision, Sep 20-27, 1999, pp. 666-673, vol. 1.
Ishii et al., "A Practical Calibration Method for Top View Image Generation", International Conference on Consumer Electronics, 2008, pp. 1-2.
Kano et al., "Precise Top View Image Generation without Global Metric Information", IEICE Trans. Inf. & Syst., Jul. 2008, pp. 1893-1898, vol. E91-D, No. 7.
(Continued)

Primary Examiner — Hee-Yong Kim
(74) Attorney, Agent, or Firm — Muncy, Geissler, Olds & Lowe, P.C.

(57) ABSTRACT

An image conversion method is provided. An image of a calibration reference pattern is captured. A plurality of first and a plurality of second characteristic patterns of the calibration reference pattern are identified. Coordinates of the first and second characteristic patterns in a first view angle coordinate system are obtained, and coordinates of the first and second characteristic patterns in a second view angle coordinate system are obtained, to obtain a coordinate conversion relationship between the first and second view angle coordinate systems. An input image is converted to an output image according to the coordinate conversion relationship.

20 Claims, 7 Drawing Sheets

(56) References Cited

U.S. PATENT DOCUMENTS

| | | |
|---|---|---|
| 2008/0181488 A1 | 7/2008 | Ishii et al. |
| 2008/0186384 A1 | 8/2008 | Ishii et al. |
| 2008/0231710 A1* | 9/2008 | Asari .................. H04N 17/002 348/187 |
| 2010/0082281 A1 | 4/2010 | Nakamura et al. |

FOREIGN PATENT DOCUMENTS

| | | |
|---|---|---|
| TW | 200530558 A | 9/2005 |
| TW | 200834032 A | 8/2008 |
| TW | 200927537 | 7/2009 |
| TW | M387029 | 8/2010 |

OTHER PUBLICATIONS

Nieto et al., "Stabilization of Inverse Perspective Mapping Images based on Robust Vanishing Point Estimation", IEEE Intelligent Vihicles Symposium, Jun. 13-15, 2007, pp. 315-320.

Kotb et al., "Generalizing Inverse Perspective", Proceedings of the Second Canadian Conference on Computer and Robot Vision, Jan. 31, 2005, 7 pages.

Bucher, "Measurement of Distance and Height in Images based on easy attainable Calibration Parameters", IEEE Intelligent Vehicles Symposium, Oct. 3-5, 2000, pp. 314-319.

Bertozzi et al., "Stereo inverse perspective mapping: theory and applications", Image and Vision Computing, 1998, pp. 585-590, vol. 16.

\* cited by examiner

IMAGE CONVERSION METHOD AND DEVICE USING CALIBRATION REFERENCE PATTERN

This application claims the benefit of Taiwan application Serial No. 101151114, filed Dec. 28, 2012, the disclosure of which is incorporated by reference herein in its entirety.

TECHNICAL FIELD

The disclosure relates in general to automatic calibration for a vehicle camera, and more particularly to an automatic calibration reference pattern for a vehicle camera and a setting method thereof, and an image conversion method and an image conversion device.

BACKGROUND

Driving safety is crucial for drivers and passengers. Many techniques are available for assisting driving safety. For example, when reversing a vehicle, images behind the vehicle can be captured by a rear camera. Thus, in addition to observing with the naked eye, a driver may also determine whether obstacles or pedestrians are behind the vehicle though images captured by a rear safety assist system.

Safety assist systems (e.g., all-around-view driver assistance systems, forward collision avoidance systems, rear safety assist systems, and side blind-spot detection systems) are usually equipped with a vehicle camera for capturing images outside a vehicle. Before being shipped out of the factory, the vehicle cameras installed in vehicles need to be calibrated first.

In a conventional human-interface calibration, a vehicle camera is manually fine-tuned by a calibration staff, such that characteristic patterns in captured images satisfy predetermined conditions and then image capture is adjusted to correct position/direction of the camera through the human-interface operation. A system then calculates camera extrinsic parameters and camera intrinsic parameters for coordinate conversion.

However, due to human factors such as different observations and different carefulness of different calibration staff, image errors are resulted in the current calibration procedure. Further, the calibration procedure requires paying special attention on setting of calibration reference patterns and solving extrinsic parameters may be a tremendous computation load on the system.

SUMMARY

The disclosure is directed to a calibration reference pattern for a vehicle camera, a method for setting a calibration reference pattern for a vehicle camera, and an image conversion and device applying the same.

According to one embodiment, a calibration reference pattern for automatically calibrating a vehicle camera is provided. The calibration reference pattern comprises: a first calibration reference sub-pattern, comprising a first characteristic pattern group, at least one straight line and a plurality of first grid lines, wherein the first characteristic pattern group has at least two identical first characteristic patterns; and a second calibration reference sub-pattern, comprising a second characteristic pattern group and a second straight line, wherein the second characteristic pattern group has at least two identical second characteristic patterns. The first characteristic patterns of the first characteristic pattern group are equidistant from a border of the first calibration reference sub-pattern. The second characteristic patterns of the second characteristic pattern group are equidistant from a border of the second calibration reference sub-pattern.

According to another embodiment, a method for setting a calibration reference pattern is provided. The calibration reference pattern is as described above. The method comprises: placing two marking lines to align with two sides a vehicle and crossing the marking lines to position a central extension line of the vehicle respectively; aligning the first straight line of the first calibration reference sub-pattern with the central extension line of the vehicle; and aligning two ends of the second straight lines of the second calibration reference sub-pattern to the first grid lines of the first calibration reference sub-pattern, respectively.

According to another embodiment, an image conversion method is provided. The image conversion method converts a captured input image in a first view angle coordinate system to an output image in a second view angle coordinate system. An image as the foregoing calibration reference pattern is captured. The image conversion method comprises: identifying the first and second characteristic patterns of the calibration reference pattern; obtaining coordinates of the first and second characteristic patterns in the first view angle coordinate system; and obtaining the first and second characteristic patterns in the second view angle coordinate system, to obtain a coordinate conversion relationship between the first view angle coordinate system and the second view angle coordinate system; and converting the input image to the output image according to the coordinate conversion relationship.

According to yet another embodiment, an image conversion device is provided. The image conversion device, for converting a captured input image in a first view angle coordinate system to an output image in a second view angle coordinate system, comprises an image capturing unit, a characteristic retrieval unit and a coordinate conversion unit. The image capturing unit captures an image as the foregoing calibration reference pattern. The characteristic retrieval unit identifies the first and second characteristic patterns of the calibration reference pattern. The coordinate conversion unit obtains coordinates of the first and second characteristic patterns in the first view angle coordinate system and obtains the first and second characteristic patterns at the second view angle coordinate system, to obtain a coordinate conversion relationship between the first view angle coordinate system and the second view angle coordinate system; and converts the input image to the output image according to the coordinate conversion relationship.

DETAILED DESCRIPTION

Figure 1:
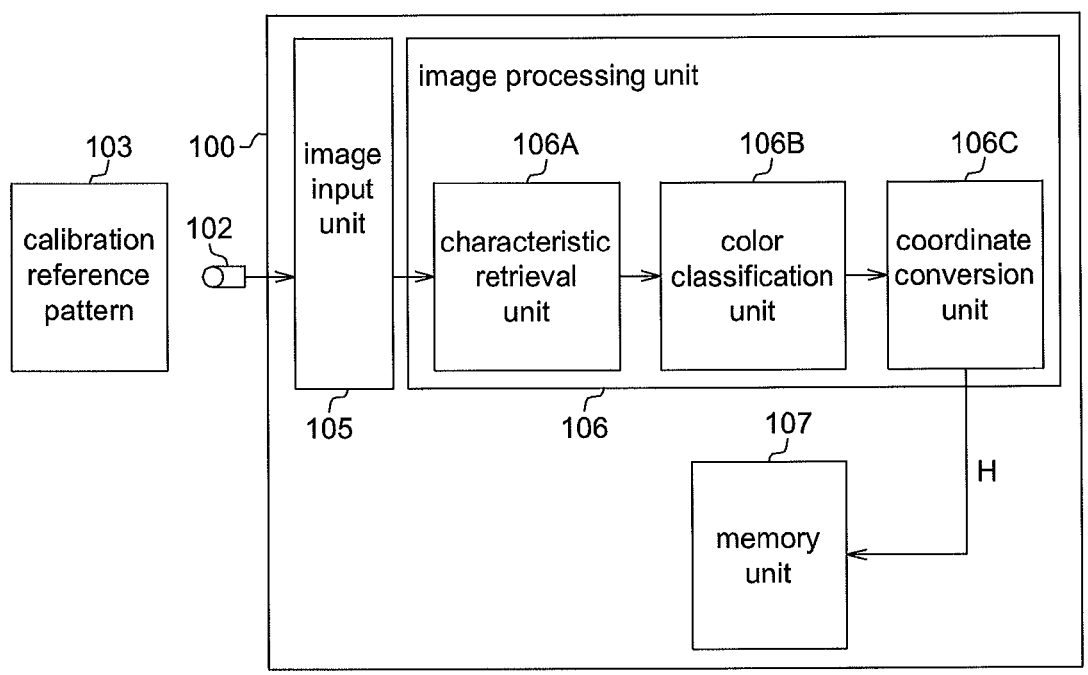
FIG. 1 is a block diagram of a vehicle camera calibration device according to one embodiment.

In the following detailed description, for purposes of explanation, numerous specific details are set forth in order to provide a thorough understanding of the disclosed embodiments. It will be apparent, however, that one or more embodiments may be practiced without these specific details. One or more embodiments may be practiced without these specific details. In other instances, well-known structures and devices are schematically shown in order to simplify the drawing.

In the embodiments, a length and a width of a calibration reference pattern as well as distances between characteristic points of the calibration reference pattern are known. Considering a longest bird view distance required by a user, position relationships of the characteristic points under different view angle coordinate systems are estimated to obtain a conversion relationship between different view angle coordinate systems. In the embodiments, the calibration reference pattern, image contour characteristic recognition and optional color classification are used to achieve automatic calibration for a vehicle camera.

FIG. 1 shows a block diagram of a vehicle camera calibration device 100 according to one embodiment. As shown in FIG. 1, the vehicle camera calibration device 100 includes an image input unit 105, an image processing unit 106 and a memory unit 107.

For example, an image capturing unit 102 is a vehicle camera which is carried by a vehicle, and has an image capturing horizontal view angle of for example but not limited to 40 to 190 degrees, an image capturing frequency of for example but not limited to 15 to 30 frames/second, and an output frequency of for example but not limited to 15 to 30 frames/second.

Details of a calibration reference pattern 103 are described shortly.

The image input unit 105 receives image data transmitted from the image capturing unit 102. For example, the image data is from the image capturing unit 102 when the image capturing unit 102 captures the calibration reference pattern 103.

The image processing unit 106 performs image characteristic identification, color classification and calculation of a view angle coordinate conversion relationship according to image of the calibration reference pattern. The view angle coordinate conversion relationship describes relationship between an image coordinate system and a bird view coordinate system.

The image processing unit 106 includes a characteristic retrieval unit 106A, a color classification unit 106B and a coordinate conversion unit 106C. The characteristic retrieval unit 106A performs image characteristic identification on the calibration reference pattern 103, with associated details to be described shortly. The color classification unit 106B performs color classification on the calibration reference pattern 103, with associated details also to be described shortly. The coordinate conversion unit 106C calculates the relationship (e.g., a single transformation matrix H) between different view angle coordinate systems. Further, the color classification unit 1066 may be optional. The reason is as follows. The calibration reference pattern may include a plurality of characteristic patterns which may be patterns (e.g., circles, squares and triangles), lines or texts or any combination thereof. For characteristic patterns having different shapes/lines but the same color, the color classification unit 106-6 may be ignored.

The memory unit 107 temporarily stores the view angle coordinate conversion relationship calculated by the image processing unit 106, temporary image data and system operation values. The memory unit 107 is for example but not limited by a memory. For example, the units 105, 106, 106A, 1066, 106C are implemented by hardware or software or firmware.

In an alternative embodiment, other optional elements such as a digital signal processing-control unit (e.g., a DSP or CPU) or an image outputting unit may be included. The digital signal processing-control unit performs functions such as peripheral circuit initialization, image characteristic and color identification, color classification, coordinate conversion and bird view conversion (e.g., converting a real-time captured image in front/behind/at the left/at the right of the vehicle to a real-time bird view image). The image outputting unit outputs images processed by the digital signal processing-control unit to display to a user.

Figure 2:
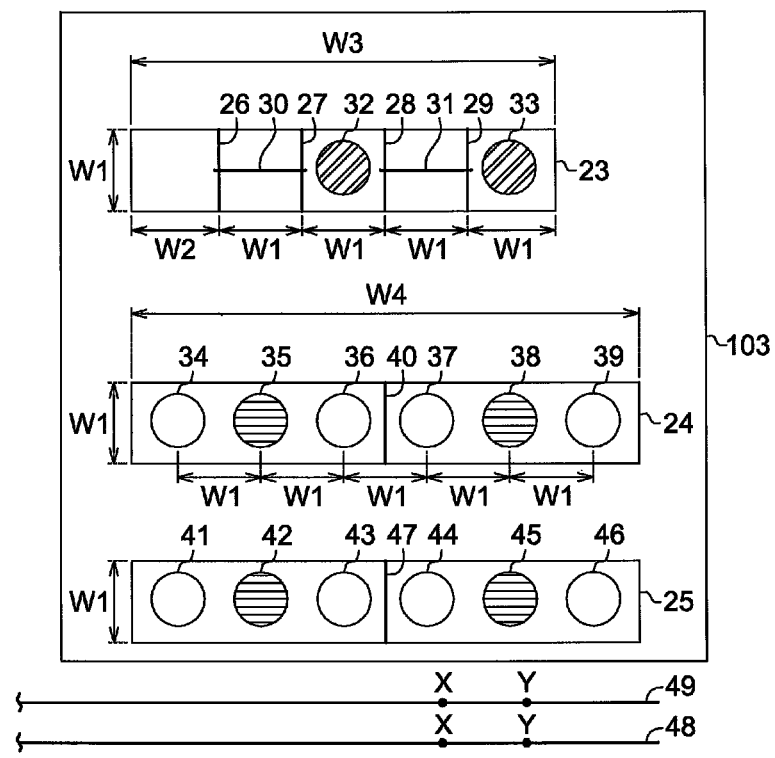
FIG. 2 is an example of a calibration reference pattern according to one embodiment.

FIG. 2 shows an example of the calibration reference pattern 103 according to one embodiment. As shown in FIG. 2, the calibration reference pattern 103 includes three calibration reference sub-patterns 23, 24 and 25, which are rectangular, for example. The first calibration reference sub-pattern 23 is placed at an extension line along a center of the vehicle, with details for determining a position for placing the first calibration reference sub-pattern 23 to be described shortly. The second calibration reference sub-pattern 24 and the third calibration reference sub-pattern 25, having substantially the same or similar structure, are placed on the calibration reference sub-pattern 23 and perpendicularly cross the calibration reference sub-pattern 23.

The first calibration reference sub-pattern 23 includes a first characteristic pattern group, first straight lines and first grid lines. The first characteristic pattern group has at least two identical first characteristic patterns, e.g., two circular sub-patterns 32 and 33. For example, the first straight lines include horizontal lines 30 and 31, and the first grid lines include grid lines 26, 27, 28 and 29. In the embodiment, for example, the circular sub-patterns 32 and 33 are blue. To facilitate alignment of the second calibration reference sub-pattern 24 and the third calibration reference sub-pattern 25 (to be perpendicularly placed on the first calibration reference sub-pattern 23), the horizontal line 30 crosses and protrudes at the grid lines 26 and 27, and the horizontal line 31 crosses and protrudes at the grid lines 28 and 29. The calibration reference sub-pattern 23 has a width W1 and a total length W3. The grid lines 26 and 27 are spaced by the distance W1, the grid lines 27 and 28 are spaced by the distance W1, the grid lines 28 and 29 are spaced by the distance W1, the grid line 29 and a border of the calibration reference sub-pattern 23 are spaced by the distance W1, and the grid line 26 and one other border of the calibration reference sub-pattern 23 are spaced by a distance W2. That is, W3=4*W1+W2. In other words, distances between centers of the circular sub-patterns 32 and 33 and the borders of the calibration reference sub-pattern 23 are known. The first characteristic patterns are equidistant from the border of the first characteristic pattern 23. For example, characteristic points (e.g., centers, which are utilized as examples in the following descriptions) of the circular sub-patterns 32 and 33 are equidistant from a horizontal border of the first calibration reference sub-pattern 23. Extension lines of the horizontal lines 30 and 31 pass through the centers of the circular sub-patterns 32 and 33, respectively. The grid lines 26, 27, 28 and 29 are equidistant from one another, and a distance between one of the grid lines and another border of the first calibration reference sub-pattern 23 (e.g., the distance W1 between the grid line 29 and a right border of the first calibration reference sub-pattern 23) equals the distances between the grid lines.

The second calibration sub-pattern 24 includes a second characteristic pattern group and at least one second straight line. The second characteristic pattern group has at least two identical characteristic patterns, e.g., sub-patterns 34, 35, 36, 37, 38 and 39. For example, the straight line has a horizontal line 40. In the embodiment, for example, the sub-patterns 34, 35, 36, 37, 38 and 39 are circular. The second calibration reference sub-pattern 24 has a width W1 and a total length W4. A distance between centers of two neighboring circular sub-patterns 35, 36, 37, 38 and 39 is W1. The horizontal line 40 is located at the center of the second calibration reference sub-pattern 24. Distances from the centers of the circular sub-patterns 35, 36, 37, 38 and 39 to a border of the second calibration reference sub-pattern 24 are known. The second characteristic patterns are equidistant to a border of the second calibration reference sub-pattern 24. For example, the centers of circular sub-patterns 35, 36, 37, 38 and 39 are equidistant to a border (having a length W4) of the second calibration reference sub-pattern 24. The horizontal line 40 is located on a perpendicular bisector by connecting the centers of the sub-patterns 36 and 37, or the centers of the sub-patterns 35 and 38 or the centers of the sub-patterns 34 and 39. Distances between the first calibration reference sub-pattern and the grid lines 26 and 27 are equal to the vertical width W1 of the second calibration reference sub-pattern 24. The horizontal line 40 (i.e. the second straight line) is between the second characteristic patterns (34~39).

Similarly, the third calibration reference sub-pattern 25 includes a third characteristic pattern group and at least a third straight line. The third characteristic pattern group has at least two identical third characteristic patterns, e.g., sub-patterns 41, 42, 43, 44, 45 and 46. For example, the third straight line includes a horizontal line 47. In the embodiment, for example, the sub-patterns 41, 42, 43, 44, 45 and 46 are circular. The third calibration reference sub-pattern 25 has a width W1 and a total length W4. A distance between centers of two neighboring circular sub-patterns 41, 42, 43, 44, 45 and 46 is W1. The horizontal line 47 is located at the center of the calibration reference sub-pattern 25. The distances from the centers of the circular sub-patterns 41, 42, 43, 44, 45 and 46 to a border of the third calibration reference sub-pattern 25 are known. The third characteristic patterns are equidistant from a border of the third calibration reference sub-pattern 25. For example, the centers of circular sub-patterns 41, 42, 43, 44, 45 and 46 are equidistant from a border (having a length W4) of the third calibration reference sub-pattern 25. The horizontal line 47 is located on a perpendicular bisector formed by connecting the centers of the sub-patterns 43 and 44, or the centers of the sub-patterns 42 and 45 or the centers of the sub-patterns 41 and 46. Distances between the first calibration reference sub-pattern 23 and the grid lines 28 and 29 are equal to the vertical width W1 of the third calibration reference sub-pattern 25. In FIG. 2, the calibration reference sub-patterns 24 and 25 are substantially the same. In an alternative embodiment, the calibration reference sub-patterns placed perpendicularly on the calibration reference sub-pattern 23 may be different. However, the calibration reference sub-patterns 24 and 25 may be substantially the same so that the manufacturing process is simple.

To meet identification requirements of the vehicle camera calibration device 100, in the embodiment, the circular sub-patterns 34, 35, 36, 37, 38 and 39 have different colors. For example, the circular sub-patterns 35, 38, 42, and 45 are red, and the circular sub-patterns 34, 36, 37, 39, 41, 43, 44 and 46 are black. As such, when identifying the circular sub-patterns, the vehicle camera calibration device 100 may determine whether the identified circular sub-patterns are in the calibration reference sub-patterns 24 or 25, and determine the orders of the identified circular sub-patterns in the calibration reference sub-patterns 24 or 25.

When calibrating the vehicle camera, the calibration reference pattern 103 is utilized in cooperation with two marking lines 48 and 49. For example, each of the marking lines 48 and 49 is marked with two positioning points (e.g., red spots) X and Y at two predetermined positions during installation of the calibration reference pattern. In the embodiment, for example, the marking lines 48 and 49 have the same length. In another embodiment, given that the lengths of the marking lines 48 and 49 are sufficient for marking the positioning points X and Y, the marking lines 48 and 49 may have different lengths.

FIGS. 3A to 3E show setting of the calibration reference pattern according to one embodiment. In the embodiment, an example that the image capturing unit 102 captures images behind a vehicle is illustrated, but the application is not limited by this.

Figure 3A:
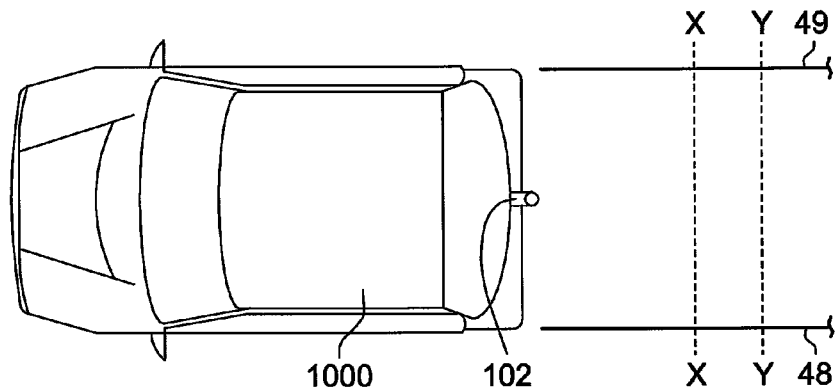
FIGS. 3A to 3E show setting of a calibration reference pattern according to one embodiment.
Figure 3B:
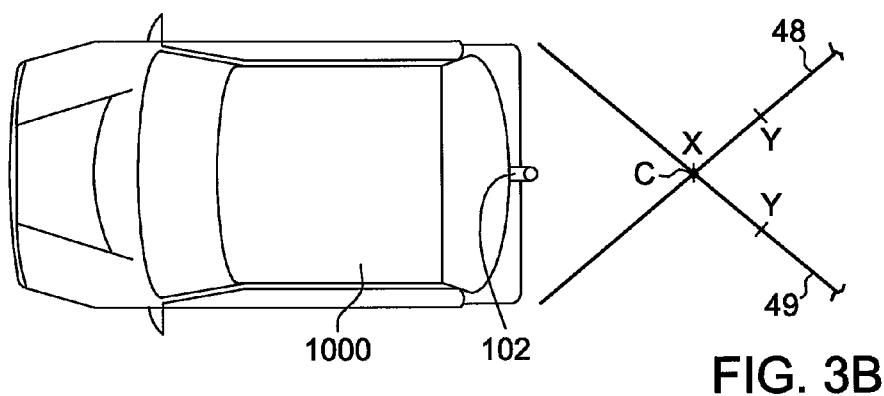
Figure 3C:
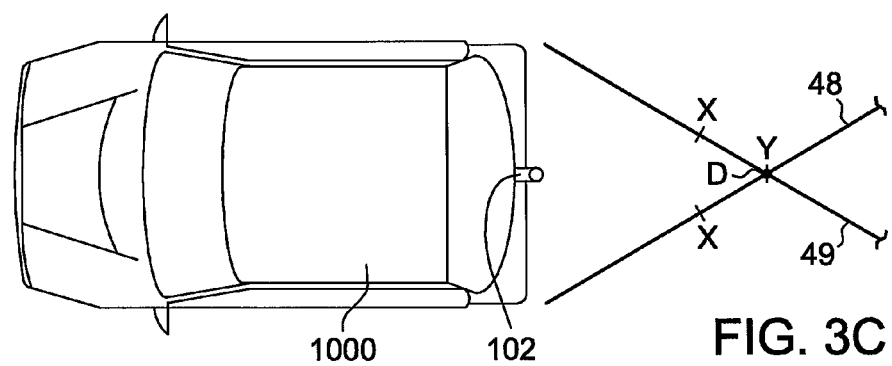

As shown in FIG. 3A, the marking lines 48 and 49 are placed to align with two sides of a vehicle 1000, respectively. As shown in FIG. 3B, the marking lines 48 and 49 are crossed, such that the two positioning points X of the marking lines 48 and 49 intersect each other, with the intersection denoted as an intersection C. As shown in FIG. 3C, the marking lines 48 and 49 are crossed, such that the two positioning points Y of the marking lines 48 and 49 intersect each other, with the intersection denoted as an intersection D.

Figure 3D:
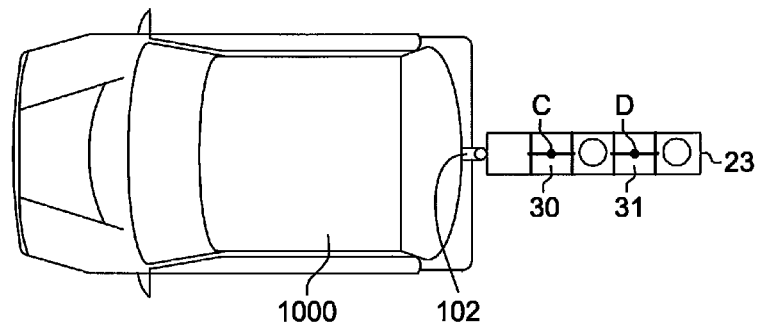

As shown in FIG. 3D, the two horizontal lines 30 and 31 of the calibration reference sub-pattern 23 are aligned with the intersections C and D, respectively.

Figure 3E:
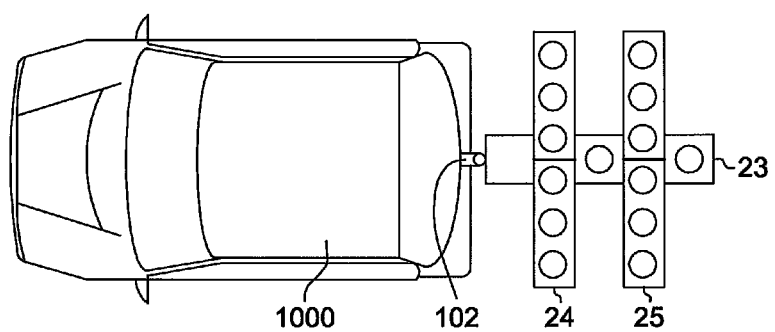

As shown in FIG. 3E, two ends of the central line 40 of the calibration reference sub-pattern 24 are aligned to the grid lines 26 and 27 of the calibration reference sub-pattern 23, and two ends of the central line 47 of the calibration reference sub-pattern 25 are aligned to the grid lines 28 and 29 to complete setting of the calibration reference pattern.

In the embodiment, the example that the image capturing unit 102 captures images behind the vehicle is described for illustration purposes. In an alternative embodiment, the image capturing unit 102 may capture images in front/at the right/at the left of the vehicle, and the marking lines 48 and 49 and the calibration reference sub-patterns 23 to 25 are placed in front/at the right/at the left of the vehicle. Associated details may be referred from the above descriptions, and shall be omitted herein.

To facilitate the alignment operation, the horizontal lines 30 and 31 of the calibration reference sub-pattern 23 may be transparent or light-transmissive, so that the two horizontal lines 30 and 31 of the calibration reference sub-pattern 23 may be easily aligned with the intersections C and D. Further, as previously described, the horizontal line 30 crosses and protrudes at the grid lines 26 and 27, and the horizontal line 31 crosses and protrudes at the grid lines 28 and 29. Such design is helpful for the two ends of the central line 40 of the calibration reference sub-pattern 24 to be aligned to the grid lines 26 and 27 of the calibration reference sub-pattern 23, and the two ends of the central line 47 of the calibration reference sub-pattern 25 to be aligned to the grid lines 28 and 29 of the calibration reference sub-pattern 23.

Figure 4A:
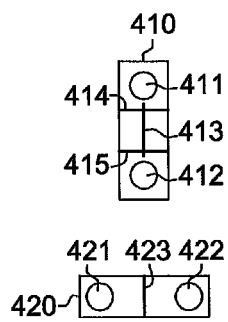
FIGS. 4A and 4B are a calibration reference pattern and placement of the calibration reference pattern according to one embodiment.
Figure 4B:
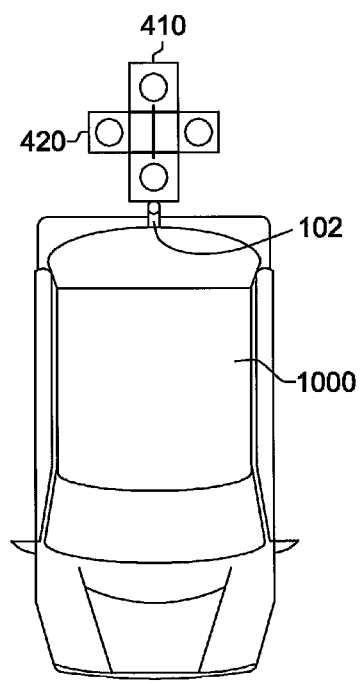

FIGS. 4A and 4B show a calibration reference pattern according to one embodiment and the placement thereof. As shown in FIG. 4A, a first calibration reference pattern 400 includes a first calibration reference sub-pattern 410 and a second calibration reference sub-pattern 420. For example, the first calibration reference sub-pattern 410 and the second calibration reference sub-pattern 420 are rectangular. The first calibration reference sub-pattern 410 is placed at an extension line along a center of a vehicle. Details about how to place the first calibration reference sub-pattern 410 may be referred from FIGS. 3A to 3C. The second calibration reference sub-pattern 420 is aligned the first calibration reference sub-pattern 410 and perpendicularly crosses the first calibration reference sub-pattern 410.

The first calibration reference sub-pattern 410 includes a first characteristic pattern group, at least one first straight line and a plurality of first grid lines. The first characteristic pattern group has at least two identical first characteristic patterns, e.g., two circular sub-patterns 411 and 412. For example, the first straight line includes a horizontal line 413, and the first grid lines include grid lines 414 and 415. In the embodiment, for example, the circular sub-patterns 411 and 412 are blue. To facilitate the alignment of the calibration reference sub-pattern 420, the horizontal line 413 crosses and protrudes at the grid lines 414 and 415. A width and a length of the first calibration reference sub-pattern 410, a distance between the grid lines 414 and 415, a distance from the grid line 414 to a border of the first calibration reference sub-pattern 410, and a distance from the grid line 415 to another border of the first calibration reference sub-pattern 415 are known. Further, distances from centers of the circular sub-patterns 411 and 412 to a border of the first calibration reference sub-pattern 410 are known. The first characteristic patterns are equidistant from a border of the first calibration reference sub-pattern 410. For example, centers of the circular sub-patterns 411 and 412 are equidistant from a border of the first calibration reference sub-pattern 410. An extension line from the horizontal line 413 passes through the centers of the circular sub-patterns 411 and 412. The grid lines 414 and 415 are equidistant from each other, and a distance from one of the grid lines 414 and 415 to another border of the first calibration reference sub-pattern 410 (e.g., a distance from the grid line 414 to an upper border of the first calibration reference sub-pattern 410) equals the distance between the grid lines 414 and 415. The circular sub-patterns 411 and 412 are identical in shape and color. For example, the horizontal line 413 is transparent or light-transmissive for facilitating the alignment of the calibration reference sub-patterns 420 and 410.

The second calibration reference sub-pattern 420 includes a second characteristic pattern group and a straight line. The second characteristic pattern group has at least two identical second characteristic patterns, e.g., two sub-patterns 421 and 422. For example, the second straight line is a horizontal line 423. In the embodiment, for example, the sub-patterns 421 and 422 are circular. Similarly, a width and a length of the calibration reference sub-pattern 420 and a distance between centers of the two circular sub-patterns 421 and 422 are known. The horizontal line 423 is located at the center of the calibration reference sub-pattern 420. Distances from the centers of the circular sub-patterns 421 and 422 to a border of the calibration reference sub-pattern 420 are known. The second characteristic patterns are equidistant from a border of the second calibration reference sub-pattern 420. For example, the centers of the sub-patterns 421 and 422 are equidistant from a border of the second calibration reference sub-pattern 420. The horizontal line 423 is located on a perpendicular bisector formed by connecting the centers of the sub-patterns 421 and 422. A distance between the grid lines 414 and 415 of the first calibration reference sub-pattern 410 is equal to the width of the second calibration reference sub-pattern 420. The sub-patterns 421 and 422 and are identical in color and shape.

As shown in FIG. 4B, in placement, the calibration reference sub-pattern 410 is perpendicular to the vehicle and the calibration reference sub-pattern 420 is perpendicular to the calibration reference sub-pattern 410.

Referring to FIGS. 2 and 4A, in the embodiments, the calibration reference pattern includes a plurality of characteristic patterns (e.g., the circular sub-patterns), and the length and width of the calibration reference pattern, the distances between the characteristic patterns, and the distances between the characteristic patterns and the border are known. The length of the marking lines is also known. Further, the characteristic patterns may be patterns (e.g., circles, squares and triangles), lines or texts or any combination thereof. For example, the characteristic points of squares, triangles and lines may be geometric centers or corners, and the characteristic points of texts may be corners. Further, for characteristic patterns having different colors, the characteristic patterns may be in a same shape or different shapes. Alternatively, for characteristic patterns having different shapes, the characteristic patterns may have the same color or different colors.

Figure 5:
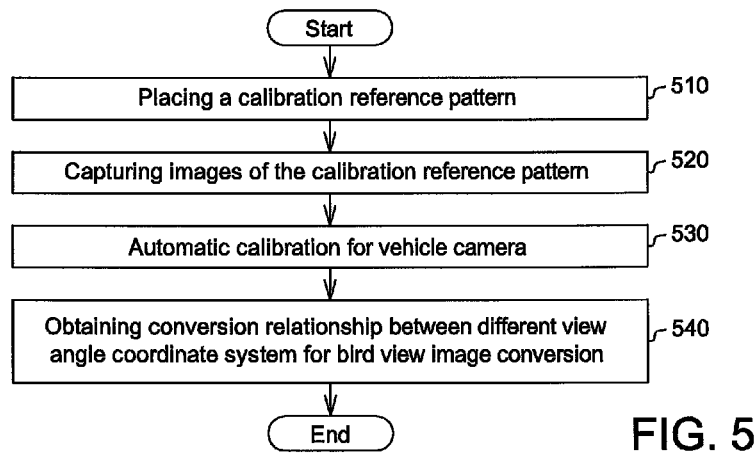
FIG. 5 is a flowchart of a vehicle camera calibration process according to one embodiment.

FIG. 5 shows a flowchart of a vehicle camera calibration process according to one embodiment. As shown in FIG. 5, in step 510, the calibration reference pattern is placed. Details for setting/placing the calibration reference pattern can be referred from associated descriptions above, and shall be omitted herein.

In step 520, an image of the calibration reference pattern which is placed is captured, e.g., by the image capturing unit 520.

In step 530, automatic calibration for the vehicle camera is performed, with details thereof to be described shortly. In step 530, characteristic patterns of the calibration reference pattern are identified through image identification and color classification to determine whether the video camera is placed in a correct position/direction. If not, the vehicle camera is automatically adjusted and step 520 is repeated until the video camera is placed in a correct position/direction. In principle, steps 510 to 530 are sufficient for calibration of the vehicle camera. In the embodiment, images which are real-time captured may be converted to bird view images, for fast automated view angle conversion.

In step 540, after the automatic calibration, for the characteristic patterns of the calibration reference pattern which are identified, coordinates of the characteristic patterns of the calibration reference pattern on an image coordinate system are found to obtain a conversion relationship (e.g., a homography matrix) between the image coordinate system and a bird view coordinate system. Further, the conversion relationship between the image coordinate system and the bird view coordinate system may be stored for coordinate system conversion and as a reference for distance estimation. That is, bird view images are obtained by converting the captured images behind the vehicle, and the bird view images are displayed to a user/driver for assisting driving safety. Details of step 540 are described below. For example, step 540 is performed by the coordinate conversion unit 106C in FIG. 1.

Figure 6:
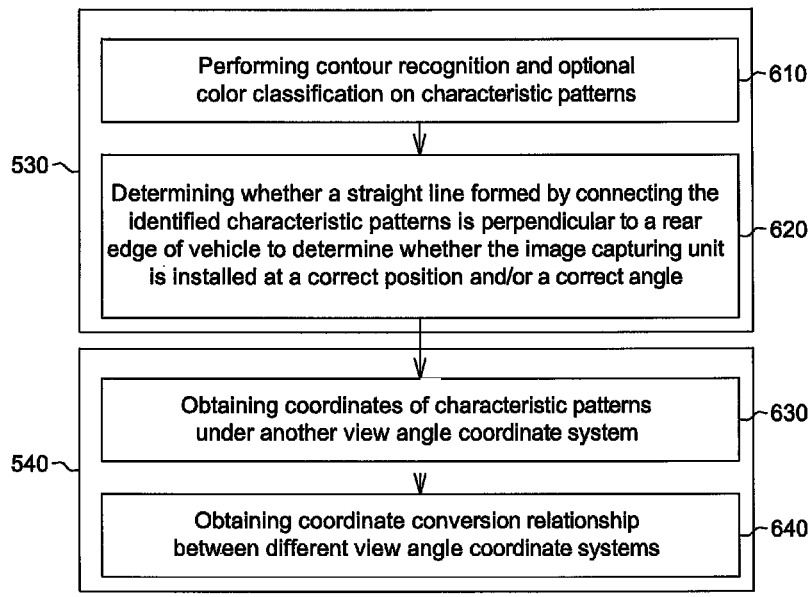
FIG. 6 shows details of steps 530 and 540 in FIG. 5.

FIG. 6 shows details of steps 530 and 540 in FIG. 5 according to one embodiment. As shown in FIG. 6, step 530 includes steps 610 and 620, and step 540 includes steps 630 and 640.

In step 610, contour recognition and optional color classification are performed on the characteristic patterns. Contour recognition is performed on the characteristic patterns of the calibration reference pattern to identify contour characteristics of the characteristic patterns to thereby obtain the characteristic patterns (e.g., center positions of circular sub-patterns). For example, the image identification is performed by the characteristic retrieval unit 106A in FIG. 1. For example but not limited by, the contour recognition may be performed by such as a Hough transform algorithm, an edge detection algorithm, a morphology algorithm or an active contour method, or any combination thereof. Color classification (e.g., performed by the color classification unit 106B in FIG. 1) identifies colors of characteristic patterns having different colors. Thus, it determines that the identified characteristic patterns belong to which of the calibration reference patterns, for positioning. Further, an arrangement order of the identified characteristic patterns can be confirmed and the center positions thereof are recorded. If the characteristic patterns have the same color, color classification may be optional.

In step 620, it is determined whether a straight line connecting two center positions of the identified blue circular sub-patterns 32 and 33 is perpendicular to a rear edge of the vehicle, to determine whether the vehicle camera is installed at a correct position/angle or not. Further, for example but not limited by, the straight line may be formed by connecting two or more coordinates of the first characteristic patterns (32, 33) and/or the second characteristic patterns (34~39) and coordinates of the first characteristic patterns (32, 33) and/or the second characteristic patterns (34~39) are the geometric centers, the corner points or the end points of the first characteristic patterns and the second characteristic patterns.

In calibration for a vehicle camera according to one embodiment, after identification by the vehicle camera calibration device 100, if the horizontal lines 30 and 31 are not perpendicular to the rear edge of the vehicle, it means that a lens of the image capturing unit 102 is deviated to the left or to the right. The vehicle camera calibration device 100 automatically sends out an instruction to adjust lens of the image capturing unit 102 to again capture images, as in step 520, until the horizontal lines 30 and 31 are substantially perpendicular to the rear edge of the vehicle. Therefore, it is demonstrated that in the embodiment, instead of manual adjustment, the lens of the image capturing unit 102 may be automatically adjusted.

In the embodiment, the actual size of the calibration reference pattern, the sizes of the characteristic patterns, and the distances from the characteristic patterns to the calibration reference pattern are known. In step 630, coordinates of the characteristic patterns in a bird view coordinate system are obtained.

In step 640, a coordinate conversion relationship between different view angle coordinate systems is obtained, with details thereof described below.

Figure 7:
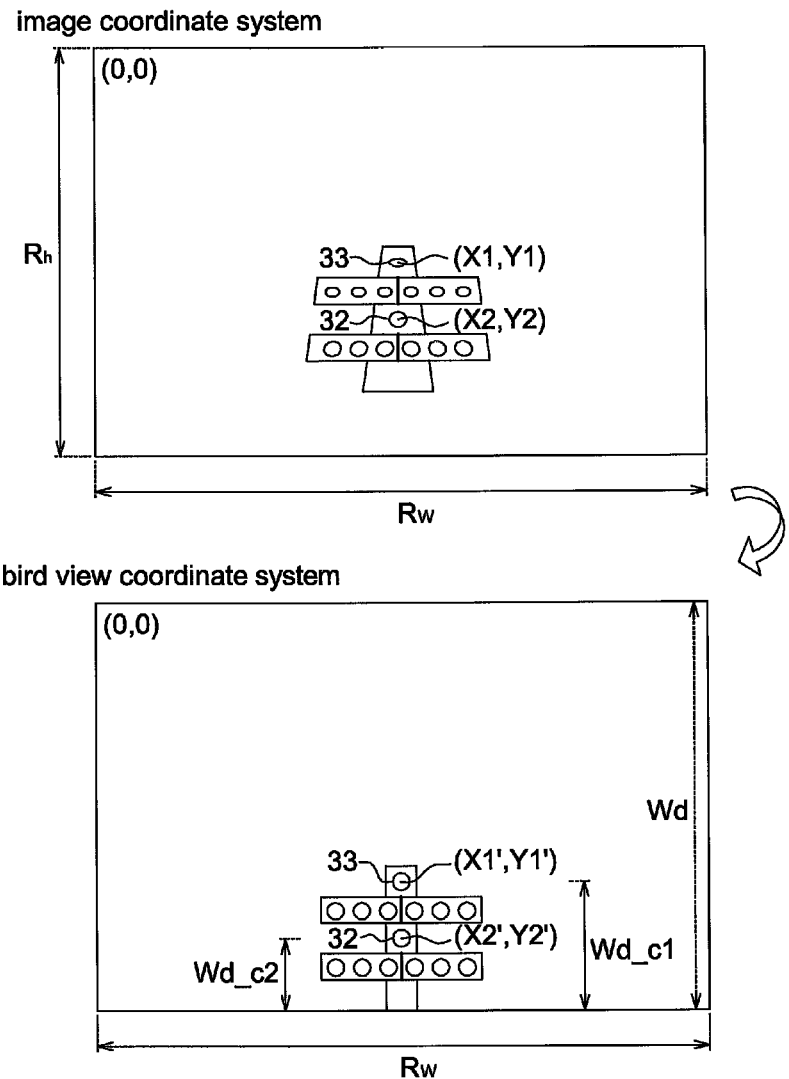
FIG. 7 shows conversion from an image coordinate system to a bird view coordinate system according to one embodiment.

FIG. 7 shows conversion between different view angle coordinate systems according to one embodiment. In FIG. 7, the upper part is an image coordinate system (corresponding to the captured image), and the lower part is a bird view coordinate system (corresponding to the bird view image converted from the captured image). In the embodiment, a farthest desirable view range (e.g., a farthest visible range in the bird view image) of the bird view coordinate system is user defined.

For example, the farthest view range is defined as Wd (in meters), and a resolution of the bird view image is Rw×Rh (the same as a resolution of the captured image).

The sizes (e.g., W1 to W4 in FIG. 2) in the calibration reference pattern are known. Thus, in FIG. 7, Wd_c1=W3−(W1/2), and Wd_c2=W2+3*(W1/2).

In the identification result, the center coordinates of the circular sub-pattern 33 are defined as (X1,Y1); and in the bird view coordinate system, the coordinates of the converted blue circle 33 are (X1', Y1').

$$X1'=Rw/2$$

$$Y1'=Rh*[1-(Wd\_c1/Wd)]$$

Similarly, in the identification result, the center coordinates of the circular sub-pattern 32 are defined as (X2,Y2); and in the bird view coordinate system, the coordinates of the converted blue circle 32 are (X2', Y2').

$$X2'=Rw/2$$

$$Y2'=Rh*[1-(Wd\_c1/Wd)]$$

As such, the bird view coordinates of all of the characteristic patterns in the calibration reference patterns under the bird view coordinate system can be deduced accordingly.

Through a homography algorithm, the transformation matrix H between the image coordinate system and the bird view coordinate system is defined as the equation below:

$$\begin{bmatrix} x_{new} \\ y_{new} \\ z_{new} \end{bmatrix} = \begin{bmatrix} H_{11} & H_{12} & H_{13} \\ H_{21} & H_{22} & H_{23} \\ H_{31} & H_{32} & H_{33} \end{bmatrix} \begin{bmatrix} x \\ y \\ z \end{bmatrix} \quad (1)$$

In equation (1), x, y and z represent pixel coordinates in the image coordinate system; $x_{new}$, $y_{new}$ and $z_{new}$ represent pixel coordinates (estimated according to the equation (1)) in the bird view coordinate system.

From a perspective of a non-homogenous coordinate system $$(x'_{new} = x_{new}/z_{new}, \ y'_{new} = y_{new}/z_{new}): \quad (2)$$

$$x'_{new} = \frac{H_{11}x + H_{12}y + H_{13}z}{H_{31}x + H_{32}y + H_{33}z},$$

$$y'_{new} = \frac{H_{21}x + H_{22}y + H_{23}z}{H_{31}x + H_{32}y + H_{33}z}$$

As the image is in a two-dimensional coordinate system, it is assumed that z=1, and equation (1) can be rewritten as:

$$x'_{new}(H_{31}x+H_{32}y+H_{33})=H_{11}x+H_{12}y+H_{13}$$

$$y'_{new}(H_{31}x+H_{32}y+H_{33})=H_{21}x+H_{22}y+H_{23} \quad (3)$$

To solve coefficients $H_{11}$ to $H_{33}$ in the transformation matrix H, equation (3) can be defined as:

$$a_x^T=0, a_y^T h=0 \quad (4),$$

where
$h=(H_{11}, H_{12}, H_{13}, H_{21}, H_{22}, H_{23}, H_{31}, H_{32}, H_{33})^T$,
$a_x=(-x, -y, -1, 0, 0, 0, x'_{new}x, x'_{new}y, x'_{new})^T$,
$a_y=(0, 0, 0, -x, -y, -1, y'_{new}x, y'_{new}y, y'_{new})^T$.

By substituting the coordinates of the 14 circular sub-patterns in the image coordinate system and the coordinates of the 14 circular sub-patterns in the bird view coordinate system into equation (4), it is obtained that:

$$Ah=0 \quad (5),$$

where $$A_{28\times 9}=(a_{x1}^T, a_{y1}^T, \ldots, a_{x14}^T, a_{y14}^T)^T \quad (6).$$

Due to lens distortion, in the above example, the transformation matrix H between the coordinate system and the bird view coordinate system is estimated based on 14 characteristic points. That is to say, to achieve distortion correction for an image captured at edges of a lens, it needs calibration characteristic points on image edges. For clear illustrations, the 14 characteristic points are described in the above example. In practice, four characteristic points are sufficient for obtaining the transformation matrix H between the image coordinate system and the bird view coordinate system. When four characteristic points are utilized, equation (6) can be rewritten as:

$$A_{8\times 9}=(a^T_{x1},a^T_{y1},\ldots,a^T_{x4},a^T_{y4})^T \quad (7)$$

For an n number of characteristic points utilized, equation (6) can be rewritten as:

$$A_{2n\times 9}=(a^T_{x1},a^T_{y1},\ldots,a^T_{xn},a^T_{yn})^T \quad (8)$$

In equation (8), n represents the number of characteristic points, and is a positive integer.

Equation (5) is solved through an optimization algorithm to obtain a single transformation matrix H having minimum errors. For example but not limited by, the optimization algorithm may be a linear least squares algorithm, a singular value decomposition algorithm, a random sample consensus (RANSAC) algorithm, a least median of squares (LMEDS) algorithm or any combination thereof.

After obtaining the optimized single transformation matrix, coordinates of non-characteristic patterns in the image coordinate system can also be converted to coordinates of non-characteristic patterns in the bird view coordinate system according to the single transformation matrix and equation (1). Further, the single transformation matrix may be stored (e.g., in the memory unit 107) for use of a vehicle safety system. By applying the single transformation matrix, a vehicle safety system is capable of real-time converting a captured image to a bird view image for displaying to a user and for distance detection or distance estimation.

In the embodiment, if the calibration reference pattern is placed according to requirements, after calibrating the vehicle camera of a first vehicle, the automatic calibration for vehicle cameras of other vehicles (that are parked at the same parking position as the first vehicle) may be performed without again installing the calibration reference pattern. Thus, the automatic calibration for vehicle cameras of other vehicles may be performed by utilizing the calibration reference pattern previously placed, to offer a fast and simple vehicle camera calibration process for vehicle manufacturers.

The view angle coordinate conversion relationship obtained from the automatic calibration for a vehicle camera in the embodiments may be applied for bird view projection conversion and distance estimation. Thus, the view angle coordinate conversion relationship may be provided to a vehicle image safety assist system for obstacle detection and distance estimation. The bird view image converted may then be outputted to a vehicle display device and presented to a user to assist in driving safety.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An image conversion method, for converting a captured input image in a first view angle coordinate system to an output image in a second view angle coordinate system, the method comprising:
    capturing an image of a calibration reference pattern comprising:
        a first calibration reference sub-pattern, comprising a first characteristic pattern group, at least one straight line and a plurality of first grid lines, the first characteristic pattern group having at least two identical first characteristic patterns; and
        a second calibration reference sub-pattern, comprising a second characteristic pattern group and a second straight line, the second characteristic pattern group having at least two identical second characteristic patterns, wherein the first characteristic patterns of the first characteristic pattern group are equidistant from a border of the first calibration reference sub-pattern, and the second characteristic patterns of the second characteristic pattern group are equidistant from a border of the second calibration reference sub-pattern;
    identifying the first characteristic patterns and the second characteristic patterns of the calibration reference pattern;
    obtaining coordinates of the first characteristic patterns and the second characteristic patterns in the first view angle coordinate system and coordinates of the first characteristic patterns and the second characteristic patterns in the second view angle coordinate system, to obtain a coordinate conversion relationship between the first view angle coordinate system and the second view angle coordinate system; and
    converting the input image to the output image according to the coordinate conversion relationship.

2. The image conversion method according to claim 1, wherein the first straight line crosses and protrudes from at least two of the first grid lines.

3. The image conversion method according to claim 1, wherein the first characteristic patterns comprise a pattern or a line or a text or any combination thereof; and the second characteristic patterns comprise a pattern or a line or a text or any combination thereof.

4. The image conversion method according to claim 1, wherein:
    at least one of a color or a shape of the first and second characteristic patterns is different; and
    the second straight line is between the second characteristic patterns, and is at a center of the second calibration reference sub-pattern.

5. The image conversion method according to claim 1, wherein the first straight line is transparent or light-transmissive.

6. The image conversion method according to claim 1, wherein
    the first calibration reference sub-pattern further comprises another of the first straight line, the grid lines are equidistant from one another, and a distance from one of the grid lines to another border of the first calibration reference sub-pattern is equal to a distance between the grid lines;
    at least one of the second characteristic patterns has a different color or a different shape from others of the second characteristic patterns and the second straight line is between the second characteristic patterns; and
    the calibration reference pattern further comprises a third calibration reference sub-pattern, and the third calibration reference sub-pattern is substantially same as or different from the second calibration reference sub-pattern.

7. The image conversion method according to claim 1, further comprising:
    determining whether a virtual straight line formed by connecting the coordinates of the identified first characteristic patterns is perpendicular to an edge of a carrier to determine whether a lens is in a correct position and/or a correction direction; and if not, automatically adjusting the lens and again capturing the image of the calibration reference pattern until the virtual straight line formed by connecting the coordinates of the identified first characteristic patterns is perpendicular to the edge of the carrier;

wherein the coordinates of the first characteristic patterns and the second characteristic patterns are the coordinates of the geometric centers, the corner points or the end points of the first characteristic patterns and the second characteristic patterns.

8. The image conversion method according to claim 1, wherein the identifying step identifies contours of the first and second characteristic patterns of the calibration reference pattern by a Hough transform algorithm, an edge detection algorithm, a morphology algorithm or an active contour algorithm or any combination thereof to determine the identified characteristic patterns belong to which of the first and second characteristic patterns of the calibration reference pattern, to perform positioning.

9. The image conversion method according to claim 1, further comprising:
identifying colors or shapes of the first and second characteristic patterns of the calibration reference pattern.

10. The image conversion method according to claim 1, further comprising:
determining an arrangement order of the first and second characteristic patterns of the calibration reference pattern and recording positions thereof.

11. An image conversion device, for converting a captured input image in a first view angle coordinate system to an output image in a second view angle coordinate system, the device comprising:
an image capturing unit, for capturing an image of a calibration reference pattern comprising:
a first calibration reference sub-pattern, comprising a first characteristic pattern group, at least one straight line and a plurality of first grid lines, the first characteristic pattern group having at least two identical first characteristic patterns; and
a second calibration reference sub-pattern, comprising a second characteristic pattern group and a second straight line, the second characteristic pattern group having at least two identical second characteristic patterns, wherein the first characteristic patterns of the first characteristic pattern group are equidistant from a border of the first calibration reference sub-pattern, and the second characteristic patterns of the second characteristic pattern group are equidistant from a border of the second calibration reference sub-pattern;
a characteristic retrieval unit, for identifying the first characteristic patterns and the second characteristic patterns of the calibration reference pattern;
a coordinate conversion unit, for obtaining coordinates of the first characteristic patterns and the second characteristic patterns in the first view angle coordinate system and coordinates of the first characteristic patterns and the second characteristic patterns in the second view angle coordinate system, to obtain a coordinate conversion relationship between the first view angle coordinate system and the second view angle coordinate system; and converting the input image to the output image according to the coordinate conversion relationship.

12. The image conversion device according to claim 11, wherein the characteristic retrieval unit determines whether a virtual straight line formed by connecting the coordinates of the identified first characteristic patterns is perpendicular to an edge of a carrier to confirm whether a lens is in a correct position and/or a correction direction; if not, the characteristic retrieval unit automatically adjusts the lens and again captures the image of the calibration reference pattern until the virtual straight line formed by connecting the coordinates of the identified first characteristic patterns is perpendicular to the edge of the carrier;

wherein the coordinates of the first characteristic patterns and the second characteristic patterns are the coordinates of the geometric centers, the corner points or the end points of the first characteristic patterns and the second characteristic patterns.

13. The image conversion device according to claim 11, wherein the characteristic retrieval unit identifies contours of the first and second characteristic patterns of the calibration reference pattern by a Hough transform algorithm, an edge detection algorithm, a morphology algorithm or an active contour algorithm or any combination thereof to determine the identified characteristic patterns belong to which of the first and second characteristic patterns of the calibration reference pattern, to perform positioning.

14. The image conversion device according to claim 11, wherein the characteristic retrieval unit identifies colors or shapes of the first and second characteristic patterns of the calibration reference pattern.

15. The image conversion device according to claim 11, wherein the characteristic retrieval unit determines an arrangement order of the first and second characteristic patterns of the calibration reference pattern and records positions thereof.

16. The image conversion device according to claim 11, wherein the first straight line crosses and protrudes from at least two of the first grid lines.

17. The image conversion device according to claim 11, wherein the first characteristic patterns comprise a pattern or a line or a text or any combination thereof; and the second characteristic patterns comprise a pattern or a line or a text or any combination thereof.

18. The image conversion device according to claim 11, wherein:
at least one of a color or a shape of the first and second characteristic patterns is different; and
the second straight line is between the second characteristic patterns, and is at a center of the second calibration reference sub-pattern.

19. The image conversion device according to claim 11, wherein the first straight line is transparent or light-transmissive.

20. The image conversion device according to claim 11, wherein
the first calibration reference sub-pattern further comprises another of the first straight line, the grid lines are equidistant from one another, and a distance from one of the grid lines to another border of the first calibration reference sub-pattern is equal to a distance between the grid lines;
at least one of the second characteristic patterns has a different color or a different shape from others of the second characteristic patterns and the second straight line is between the second characteristic patterns; and
the calibration reference pattern further comprises a third calibration reference sub-pattern, and the third calibration reference sub-pattern is substantially same as or different from the second calibration reference sub-pattern.

* * * * *